United States Patent [19]

Hoback

[11] 4,037,485

[45] July 26, 1977

[54] BELT DRIVE AND BELTS AND PULLEYS THEREFOR

[75] Inventor: Ronald D. Hoback, Lincoln, Nebr.

[73] Assignee: The Goodyear Tire & Rubber Company, Akron, Ohio

[21] Appl. No.: 642,090

[22] Filed: Dec. 18, 1975

[51] Int. Cl.² .......................... F16G 1/28; F16H 7/00
[52] U.S. Cl. .................................... 74/229; 74/231 C
[58] Field of Search .......................... 74/231 C, 231 R

[56] References Cited

U.S. PATENT DOCUMENTS

| | | | |
|---|---|---|---|
| 3,835,720 | 9/1974 | Fisher et al. | 74/231 C |
| 3,937,094 | 2/1976 | Cicognani | 74/231 C |
| 3,968,703 | 7/1976 | Bellmann | 74/231 C |
| 3,977,265 | 8/1976 | Worley et al. | 74/231 C |

*Primary Examiner*—Leonard H. Gerin
*Attorney, Agent, or Firm*—F. W. Brunner; R. P. Yaist

[57] ABSTRACT

A belt drive and belt and pulleys therefor in which a toothed power transmission belt operates in conjunction with toothed pulleys. The dimensional relationship between the belt teeth and pulley teeth is such that in the longitudinal extent of the belt between the pulleys the height of the belt teeth is greater than the height of the pulley teeth or depth of the pulley grooves while as the belt travels around the pulleys the extreme outwardly facing portions or outer extremities of the belt teeth contact the bottom of the pulley grooves and at the same time the belt teeth are compressed to reduce their height so that the extreme radially outwardly facing portions or outer extremities of the pulley teeth come in contact with the bottoms of the belt grooves. The invention is particularly useful in a synchronous or positive drive system for increasing belt life by relieving stresses on the tensile member in the area between teeth of a positive drive power transmission belt.

36 Claims, 7 Drawing Figures

BELT DRIVE AND BELTS AND PULLEYS THEREFOR

BACKGROUND OF THE INVENTION

This invention relates to belt drives in which toothed power transmission belts operate in conjunction with toothed gears or pulleys and to belts and pulleys adapted for use in such drives. More particularly this invention relates to the specific dimensional relationship between the height of the belt driving teeth and the height of the pulley teeth or depth of the pulley grooves between the pulley teeth. The invention is most particularly related to synchronous or positive drive systems in which a positive drive power transmission belt operates in conjunction with a pair of toothed pulleys.

Power transmission belts used with toothed pulleys are well-known in the art. These belts have a plurality of alternating teeth and grooves extending generally transversely of the belt which mesh with alternating teeth and grooves of the toothed pulley or sprocket in order to perform their driving function. The most widely used of these toothed belts are the so-called synchronous or positive drive belts which are manufactured from flexible resilient material such as natural or synthetic rubber. These belts are engineered and manufactured with pitch, tooth depth, width and other measurements accurate to a precise degree of extremely close tolerances being maintained. In addition, a high strength tensile stress resisting member of essentially inextensible material is provided substantially on the dedendum line of the teeth to prevent undue stretchability of the belt. This belt construction allows the flexible, resilient belt teeth to mesh without substantial change of pitch with teeth of the toothed pulleys with the belt thereby functioning as a synchronizing belt. The operation and advantages of synchronous drive belts are fully described in Case U.S. Pat. No. 2,507,852.

Conventionally in the prior art the dimensional relationship of the belt teeth and grooves and the pulley teeth and grooves has been such that in the longitudinal extent of the belt between the pulleys the height of the belt teeth is equal to or less than the depth of the pulley grooves. Consequently, as the belt travels around the pulleys either a line to line contact is established between the extreme outwardly facing portions of the belt teeth which confront the pulley and the portions of the pulley disposed between the pulley teeth which define the bottom of the pulley grooves or there is a clearance between these stated portions of the belt teeth and pulley grooves. An exception to the dimensional relationship stated above is disclosed in Elster U.S. Pat. No. 3,313,166 in which the height of the belt teeth is disclosed as being greater than the height of the pulley teeth. This results in a clearance between the extreme radially outwardly facing portions of the pulley tooth and the portions of the belt disposed between the belt teeth which define the bottoms of the belt grooves with the pulley teeth thereby engaging the belt teeth at the tooth flanks only.

Typically the belt driving teeth of the positive drive belt have been of a rectilinear cross-sectional configuration and most commonly have been of a trapezoidal configuration when viewed in longitudinal cross-section. The spacing or width of the grooves between the belt teeth originally was designed so as to be greater than the width of the root or base of the belt tooth. However, problems were encountered with belt failure due to shearing of the belt teeth resulting from the concentration of stresses in the belt. Consequently, many efforts were made to modify the existing belt tooth profile in order to solve the tooth shear problem. For example, in order to achieve a more satisfactory distribution of the load or stress on the belt, the number of belt teeth for a given length of belt has been increased. In addition, a larger size of individual belt tooth has been manufactured to provide a greater resistence to tooth shear. These approaches naturally have decreased the space between belt teeth so that the width of the root or base of the belt tooth is equal to or greater than the space between the teeth.

More recently various changes in the contour or configuration of the belt tooth have been made together with the approaches discussed above. For example, Miller U.S. Pat. No. 3,756,091 discloses a positive drive system in which the belt includes relatively closely spaced together driving teeth of a special curvilinear cross-sectional configuration which is operated in conjunction with pulley teeth having mating substantially conjugate curvilinear cross-sections.

Problems have been encountered in conventional positive drive systems with the existing dimensional relationships between the belt and the pulley teeth or grooves. Moreover, the belt modifications as discussed previously which were implemented to counter the belt tooth shear problem have created other problems due to the relative spacing of the belt teeth. For example, the tensile member of the positive drive belts in the heretofore existing systems have not been adequately supported by the teeth of the belt and therefore have been subjected to excessive stress in the area between teeth during the operation of the drive. This problem has been particularly acute in drives wherein the base or root of the belt tooth as measured substantially on the dedendum line of the tooth is greater than the space between belt teeth as measured substantially on this same line. In this instance the pulley teeth which contact the spaces between the belt teeth have a relatively small apex and the condition resulting may be likened to the belt passing over knife blades.

Additionally, excessive vibration and undesirable noise also have been encountered.

It has been found that the disadvantages of the prior art can be overcome by the present invention which will be hereinafter described.

OBJECTS OF THE INVENTION

It is a primary object of the present invention to provide a belt drive including a toothed power transmission belt and a pair of toothed pulleys or sprockets in which the dimensional relationship between the belt teeth and the pulley teeth and grooves is such that the operation of the drive is improved.

It is also an object of the present invention to provide such a toothed drive belt and toothed pulleys having this desired dimensional relationship which are intended for use in such a belt drive particularly of the positive drive type.

It is another important object of the present invention to provide a positive drive system in which the stresses on the tensile member of the positive drive belt are relieved during the operation of the drive.

It is also another important object of the present invention to provide a positive drive system in which excessive wear is prevented in the areas of the belt between the belt teeth contacted by pulley teeth.

It is still another important object of the invention to provide a positive drive system in which the positive drive belt of such system operates with a more constant angular velocity and less vibration resulting in a smoother quieter running drive.

Other objects and advantages of this invention will become apparent hereinafter as the description thereof proceeds, the novel features, arrangements and combinations being clearly pointed out in the specification as well as the claims thereunto appended.

It has been found in accordance with the present invention that the beforementioned objects can be accomplished by providing a belt drive comprising: a flexible power transmission belt having a plurality of alternating teeth and grooves extending generally transversely thereof and a pair of toothed pulleys having a plurality of alternating teeth and grooves extending generally axially thereof which engage with the belt teeth and grooves during the operation of the drive. The dimensional relationship of the belt teeth and grooves and the pulley teeth and grooves is such that in the longitudinal extent of the belt between the pulleys the height of the belt teeth is greater than the depth of the pulley grooves while as the belt travels around the pulleys, the extreme outwardly facing portions of the belt teeth which confront the pulleys come into contact with the portions of the toothed pulley disposed between the pulley teeth which define the bottom of the pulley grooves. At this same time the belt teeth are compressed to reduce their height so that the extreme radially outwardly facing portions of the pulley teeth come into contact with the portions of the belt disposed between the belt teeth which define the bottoms of the belt grooves.

The above-mentioned objects are also accomplished by providing a positive drive system comprising the combination of a positive drive belt and a pair of toothed pulleys operating in conjunction therewith. The belt includes a body of flexible polymeric material having a tensile member of high modulus essentially inextensible material embedded therein and a plurality of driving teeth of substantially uniform height formed in at least one surface thereof which extend transversely of the belt and are adapted to mesh without any significant change of pitch with the teeth of any of the toothed pulleys. The tensile member is disposed substantially on the dedendum line of the driving teeth of the belt. Each of the toothed pulleys include a plurality of teeth with each pulley tooth having a height which is less than the height of each belt driving tooth in the longitudinal extent of the belt between the pulleys, while as the belt travels around the pulleys the outer extremities of the addendum of the belt driving teeth frictionally engage the surfaces of the dedendum of the pulley between the pulley teeth with the belt driving teeth being compressed a limited amount to cause the radially outer extremities of the addendum of the pulley teeth to simultaneously frictionally engage the surface of the dedendum of the belt between the belt driving teeth.

The objects of the invention are also accomplished by providing a flexible power transmission belt adapted for use with toothed pulleys of the type described and by providing a toothed pulley adapted for use with a flexible power transmission belt of the type described.

For the purposes of this invention, the height of the belt teeth is the shortest distance from the dedendum line to the outer extremity of the addendum of the tooth. The height of the pulley teeth is the radial distance from the dedendum line of the pulley to the radial outer extremity of the pulley tooth.

DESCRIPTION OF THE PREFERRED EMBODIMENTS

Figure 1:
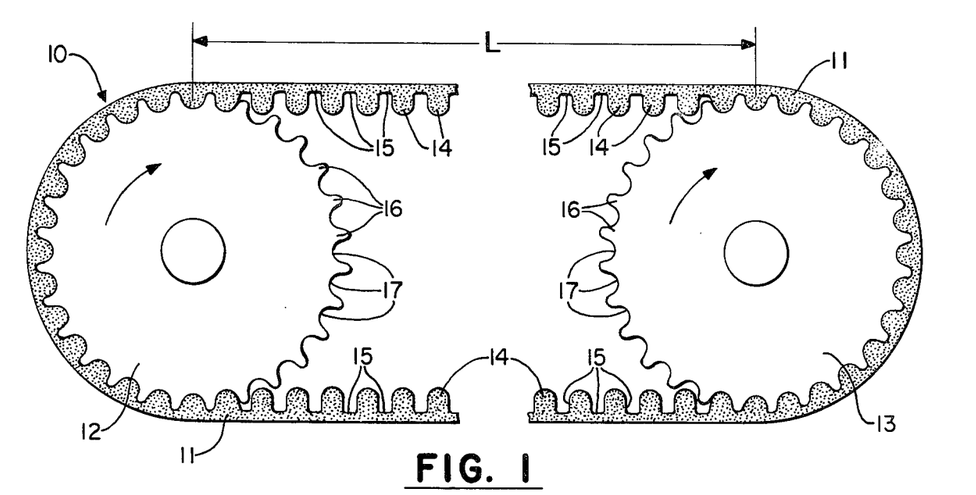
FIG. 1 is a side elevational view of the belt drive of this invention including the belt and pulleys with parts broken away.
Figure 2:
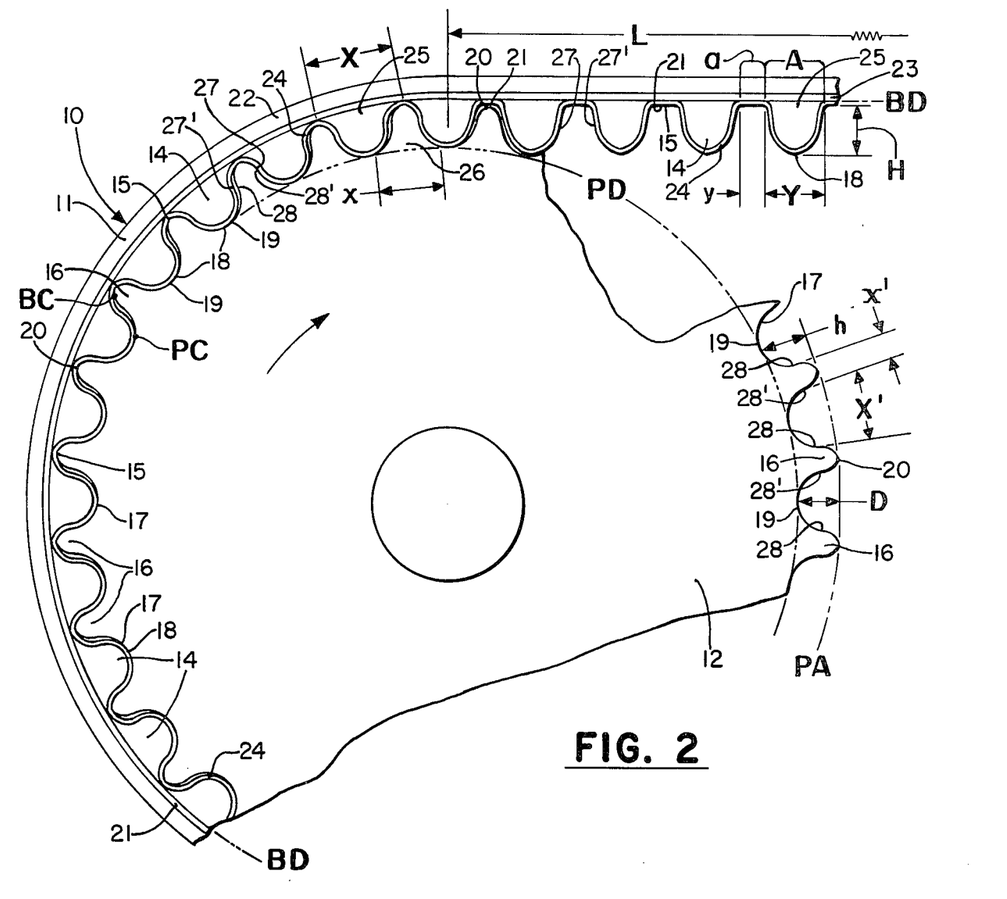
FIG. 2 is an enlarged fragmentary side elevational view of FIG. 1 more clearly indicating the dimensional relationship between the belt teeth and groove and pulley teeth and grooves with parts broken away to more clearly show the contact between the toothed belt and toothed pulley of the invention.

Referring now to the drawings, in FIGS. 1 and 2 a belt drive 10 is shown which includes a flexible power transmission belt 11 trained around a pair of gears or pulleys 12 and 13. The belt 11 includes a plurality of alternating teeth 14 and grooves 15 extending generally transversely thereof. The pulleys 12 and 13 have a plurality of alternating teeth 16 and grooves 17 extending generally axially thereof which mesh or engage with the belt teeth 14 and grooves 15 during the operation of the drive 10. In the particular arrangement shown in FIG. 1 the belt 11 is used to transmit power from the toothed driving pulley 12 to a toothed driven pulley 13. Of course it is to be understood that either pulley of the drive could be the driver pulley and that additional pulleys both toothed and untoothed could be included in the drive.

As best shown in FIG. 2, the dimensional relationship of the belt teeth 14 and grooves 15 and the pulley teeth 16 and grooves 17 is such that in the longitudinal extent L of the belt 11 between the pulleys 12 and 13 the height H of the belt teeth 14 is greater than the depth D of the pulley grooves 17. As the belt 11 travels around the pulleys 12 and 13 the extreme outwardly facing portions or outer extremities 18 of the addendum of the belt teeth 14 which confront the pulleys 12 and 13 come into contact with the portions or surfaces 19 of the dedendum of the toothed pulley 12 disposed between the pulley teeth 16 which define the bottom of the pulley grooves 17. At the same time the belt teeth 14 are compressed to reduce their height H so that the radially outwardly facing portions or outer extremities 20 of the addendum of the pulley teeth 16 come into contact with the portions or surface 21 of the dedendum of the belt 11 disposed between the belt teeth 14 which define the bottom of the belt grooves 15.

In the preferred embodiment of the invention the belt drive 10 is a positive drive system and belt 11 is of the so-called positive or synchronous drive type. The belt 11 includes a body 22 of flexible polymeric material such as natural or synthetic rubber or the like. The body 22 of the belt 11 includes a tensile member 23 of high modulus essentially inextensible material such as wrapped strands of glass fiber or steel to provide the belt with the necessary longitudinal strength and stability. A plurality of driving teeth 14 of substantially uniform height are integrally formed in at least one surface of the body 22 with the teeth extending transversely of the belt 11. If desired the driving teeth 14 can be formed in each surface of the body 22.

The tensile member 23 is disposed substantially on the dedendum line BD of the driving teeth 14 of the belt 11 as is the well-known practice in regard to synchronous drive belts (Case U.S. Pat. No. 2,507,852). The high strength tensile member 23 functions to prevent undue stretchability of the belt 11 and allows the teeth 14 to mesh more accurately with the teeth 16 of the pulley 12.

The belt driving teeth 14 are preferably formed by molding but may be ground or cast if desired. The teeth 14 also preferably include a wear facing 24 of textile fabric material for example, of woven nylon. Each belt driving tooth 14 is engineered and manufactured to a precise degree with very close tolerances being maintained so that during the operation of the belt drive system 10 the belt teeth 14 are adapted to mesh without any significant change of pitch with the teeth of the toothed pulley 12.

To state the dimensional relationship of the belt 11 and pulley 12 in a different way it may be said that the toothed pulley 12 includes a plurality of teeth 16 with each pulley tooth having a height $h$ which is less than the height H of each of the belt driving teeth 14 in the longitudinal extent L of the belt 11 between the pulleys 12 and 13 when the belt is in an unstressed condition. As the belt 11 travels around the pulleys 12 and 13 and the belt is under stress the outer extremities 18 of the addendum of the belt driving teeth 14 frictionally engage the surfaces 19 of the dedendum of the pulley 12 between the pulley teeth 16 with the belt driving teeth 14 being compressed a limited amount to cause the outer extremities 20 of the addendum of the pulley teeth 16 to simultaneously frictionally engage the surfaces 21 of the dedendum of the belt 11 between the belt driving teeth 14.

It is preferred that the height H of each belt tooth in the longitudinal extent L of the belt 11 be a maximum of about 20% greater than the depth D of each pulley groove 17 or the height $h$ of each pulley tooth 16 in order to achieve efficient operation of the drive 10. In this regard it is preferred that the height H of the belt tooth be from about 1 to about 15% greater than the depth D of each pulley groove 17 or conversely that the height $h$ of each tooth 16 of the pulley 12 be from about 1 to about 15% less than the height H of each driving tooth 14 of the belt 11 in engagement therewith. It is even more preferred that the height H of each belt tooth 14 be about 3 to about 7% greater than the depth D of each pulley groove 17 or the height $h$ of each pulley tooth 16. For optimum results the height H of each belt tooth 14 should be about 5% greater than the depth D of each pulley groove 17 or the height $h$ of each pulley tooth 16.

It can be observed by reference to FIG. 2 that the belt driving teeth 14 of increased relative height which become compressed upon contact with the surfaces 19 of the dedendum of the pulley 12 between the pulley teeth 16 provide support for the tensile member 23 in the toothed area A of the belt in which each belt tooth 14 is joined to the belt body 22. Thus the perpendicular stresses acting on the tensile member 23 are reduced in the untoothed area $a$ of the belt generally adjacent to surfaces 21 between the belt teeth 14.

The concepts of the present invention can be utilized to the greatest extent in providing support for the tensile member 23 wherein the circumferential dimension X of the base or root 25 of each belt tooth 14 as measured on its dedendum line BD is equal to or greater than the circumferential dimension $x$ of the root 26 of each pulley tooth 16 as measured on its dedendum line PD as the belt 11 rotates about the pulleys 12 and 13. For instance, the invention is partially important when the ratio of the dimension X of the root 25 of each belt tooth 14 to the dimension $x$ of the root 26 of each pulley tooth 16 is as high as about 2 to 1. To state this condition of greatest utilization differently, as the belt 11 travels around the pulleys 12 and 13 the circumferential dimension X of each belt driving tooth 14 as measured on its dedendum line BD is equal to or greater than the circumferential dimension $x$ of each pulley tooth 16 as measured on its dedendum line PD with the circumferential dimension X of each belt driving tooth 14 being about twice as great as the circumferential dimension $x$ of each pulley tooth 16.

It naturally follows that along the longitudinal extent L of the belts 11 the width or lineal dimension Y of the root 25 of each tooth 14 of the belt 11 at its base as measured substantially on its dedendum line BD is equal to or greater than the distance of space $y$ between any two belt teeth 14. The width Y of each belt tooth at its base as measured along the longitudinal extent L of the belt 11 may be from about 1½ to about 2 times as great as the width $y$ between any two belt teeth 14. By the same token, it can be seen that in regard to the pulley 12, the circumferential dimension $x'$ of the cross section of each pulley tooth 16 as measured at the intersection of the tangents of the flanks 28, 28' thereof with the addendum line PA of the pulley teeth is equal to or less than the circumferential distance X' between the confronting flanks 28, 28' of any two adjacent pulley teeth 16 as measured at the intersection of the tangents of the confronting flanks with the same line. It is possible that $x'$ may vary from about one-fourth to about one-half of X'.

In this same regard it is preferred that as the belt 11 travels around the pulleys 12 and 13 there is substantially no clearance between the flanks 27, 27' of the belt tooth 14 and the flanks 28, 28' of the pulley teeth 16 so that the spaces between the pulley teeth 16 which define the pulley grooves 17 is substantially completely filled by the belt tooth 14. However, as the belt travels around the toothed pulley 12 and the flanks 27 contact the flanks 28 of the pulley teeth 16 some clearance can be expected between the flanks 27' of the belt and the confronting flanks 28' of the pulley teeth 16.

According to the preferred embodiment of the invention, when the belt 11 is driven by the pulley 12 as in FIG. 2, the contact between the belt tooth 14 and the pulley tooth 16 is continuous from the initial pulley contact point PC on the leasing side of the dedendum line PD of the pulley to the final belt contact point BC on the lagging side of the dedendum line BD of the belt. If, the belt were driving the pulley on the other hand the contact would be continuing from the initial belt contact point BC' on the leading side of the dedendum line BD' of the belt to the final pulley contact point PC' on the lagging side of the dedendum line PD' of the pulley as shown in FIG. 2A.

Therefore, it is preferred in the practice of the present invention that there be continuous contact along the confronting driving surfaces of the belt and the pulley bounded by the respective dedendum lines thereof and beyond.

Also as is seen in FIG. 2 the support provided to the tensile member 23 by the belt tooth 14 of increased height and size relieves the stresses in area $a$ of the belt and causes the tensile member 23 to assume a substantially circular or arcuate, (non-chordal) configuration at it travels around the pulleys 12 and 13. The circular or arcuate path of the tensile member corresponds more closely to the theoretical pitch line of the pulleys. This has the effect of producing a more constant angular velocity and less vibration resulting in a smoother quieter running drive 10. Moreover, belt life is significantly increased since the wear in area $a$ of the belt is reduced.

Figures 2A, 3:
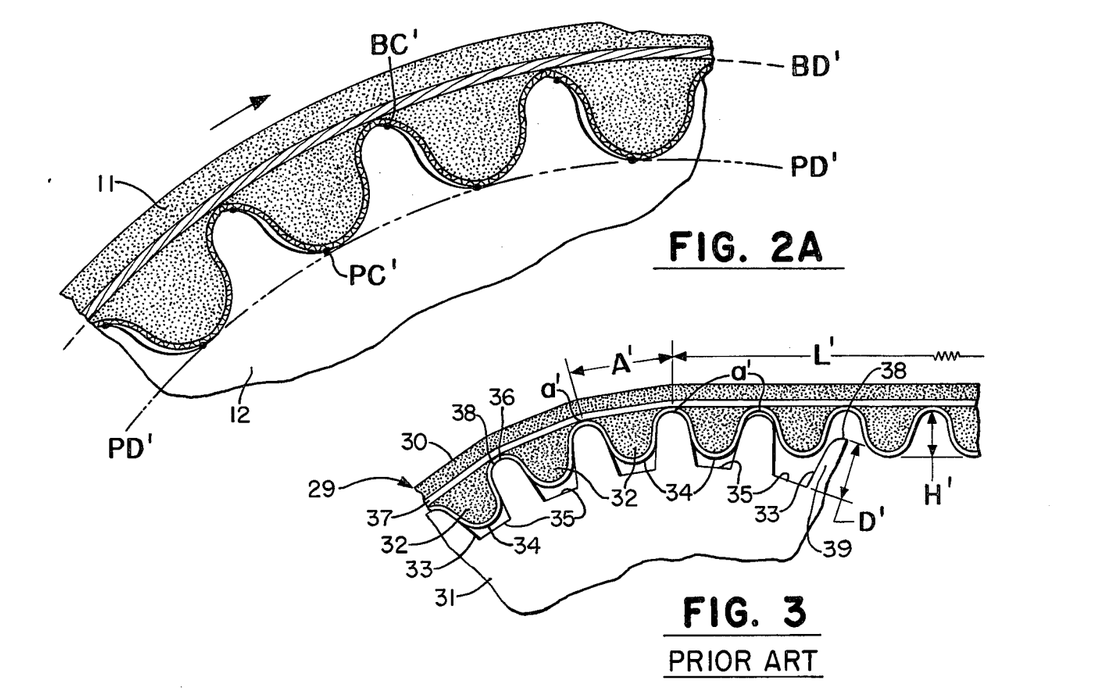
FIG. 2A is a modification of the invention shown in FIG. 2.
FIG. 3 shows the dimensional relationship between the belt teeth and grooves and pulley teeth and grooves and the contact between the belt and pulley of the prior art.

As shown in FIG. 3, in the prior art, conventional positive drive systems 29 have included the combination of a positive drive belt 30 and at least one toothed pulley 31 having the more usual dimensional relationship. For example, the conventional positive drive belt 30 has included transverse belt driving teeth 32 of a height H' usually less than or at least no greater than the depth D' of the pulley grooves 33 resulting in a clearance space between the outer extremities 34 of the belt teeth 32 and the surface 35 of the dedendum of the pulley grooves 33. The height H' of the belt 30 of the prior art remains relatively constant in both the longitudinal extent L' of the belt 30 and also as the belt 30 contacts the pulley 31. This has caused undue stresses and excessive wear to occur at the surfaces 36 of the dedendum of the belt 30 between the belt teeth 32 leading to premature failure of the belt 30 in service. Moreover, the dimensional relationship of the prior art has caused the tensile member 37 of the belt 30 to assume a chordal path as the belt 30 travels around the pulley 31 causing harmful vibrations and excessive noise during the operation of the drive 29. This is due to the fact that the tensile member 37 is inadequately supported by the belt driving teeth 32 in the toothed area A' of the belt 28. Excessive wear is caused in area $a'$ of the belt between the teeth 32 at the belt's dedendum surfaces 36 as a result of the contact by the relatively small apecies or outer extremities 38 of the addendum of the pulley teeth 39.

Figure 4:
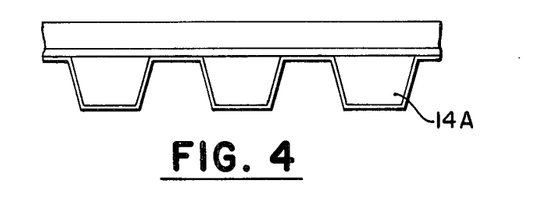
FIGS. 4, 5 and 6 are modifications of the invention as shown in FIGS. 1 and 2.
Figure 5:
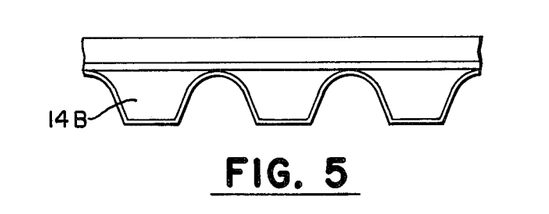
Figure 6:
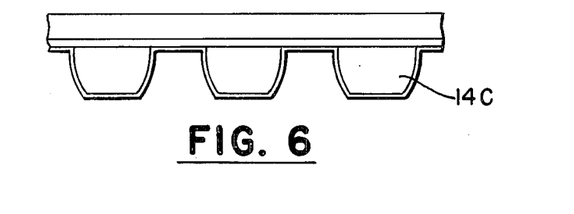

The particular cross-sectional configuration of the belt driving teeth 14 is largely immaterial in the practice of the present invention. For example, the teeth can have a curvilinear configuration when viewed in longitudinal cross-section as shown in FIGS. 1-3 of the type disclosed in Miller, U.S. Pat. No. 3,756,091. In addition, the belt driving teeth 14A can have the more conventional rectilinear or trapezoidal cross-sectional configuration as disclosed in Case U.S. Pat. No. 2,507,852 which is shown in FIG. 4 of the drawings. Also as shown in FIGS. 5 and 6 a portion of the cross-sectional configuration of each belt tooth 14B or 14C can be rectilinear and a portion thereof can be curvilinear.

The dimensional relationship of the present invention can be achieved by increasing the belt tooth height of a flexible power transmission belt which is adapted for use with pulleys of standard dimension. Additionally the same effect can also be accomplished by modifying the structure and design of at least one pulley by reducing the depth of the pulley grooves or the height of the pulley teeth to thereby adapt the pulley for use with a flexible power transmission belt of standard belt tooth size.

The following example further illustrates the objects and advantages of this invention.

EXAMPLE

In order to compare the performance of belts and pulleys having the novel dimensional relationship of this invention with those having conventional dimensional relationships the following procedure was followed. Several positive or synchronous drive belt samples were manufactured by conventional methods using conventional materials well known in the art. All the belts were formed of a neoprene rubber composition having a nylon fabric facing on the belt teeth and including a tensile member of fiber glass cords disposed substantially on the dedendum line of the belt teeth. The belt samples after manufacture were dynamically tested on toothed pulleys of appropriate dimension and configuration as will be hereinafter described.

Two types of belt constructions were tested in combination with suitable corresponding toothed pulley constructions. These combinations are identified as Types I and II. In Type I the driving teeth of each belt sample were of a curvilinear cross-sectional configuration and were tested in a belt drive in combination with pulleys of appropriate corresponding contour of the type as shown in FIGS. 1-3. All the belt samples produced had the following dimensions as measured in the longitudinal extent of the belt between the pulleys: a pitch between belt teeth of 8mm (0.315 inches); a width or lineal dimension of the base of the belt tooth of 5.18mm (0.204 inches) as measured substantially on the dedendum line of the tooth; and a distance between the belt teeth of 2.82mm (0.111 inches) as measured on the dedendum line of the belt teeth. Seven of these belt samples were of a conventional type having a belt tooth height of 3.55mm (0.140 inches). These belts are identified as belt Sample A. Three other belt samples produced in accordance with the present invention had a belt tooth height of 3.81mm (0.150 inches) or approximately 7.3% greater than the belt tooth height of belt Sample A. These samples are identified as belt Samples B.

Belts A and B were tested on conventional pulleys having a standard pulley tooth height of 3.66mm (0.144 inches). In the longitudinal extent of the belt the height of the belt teeth of Belts A were 0.11mm (0.004 inches) less than the height of the pulley teeth or depth of the pulley groove. The height of the belt teeth of Belts B were 0.15mm (0.006 inches) or approximately 4.1% greater than the height of the pulley teeth or depth of the pulley grooves.

In the Type II belt construction a portion of the driving teeth of the belt samples had a rectilinear cross-sectional configuration and a portion thereof had a curvilinear cross-sectional configuration as shown in FIG. 5 of the drawings. As measured in the longitudinal extent of the belt between the pulleys the pitch of the belt teeth was 9.54mm (0.376 inches), the width of the base or root of each belt tooth was 5.97mm (0.235 inches) as measured substantially on the dedendum line of the teeth, and the distance or spacing between the belt teeth as measured on the dedendum line was 3.58mm (0.141 inches). The belt samples had teeth having a height of 3.55mm (0.140 inches). Nine belt samples were tested with pulleys having pulley teeth of a height of 3.66mm (0.144 inches). These belt samples are identified as belt Samples C. Nine other belt samples identified as belt Samples D were tested in combination with pulleys having a tooth height of 3.38mm (0.133 inches) or about 7.6% less than the height of the conventional pulleys to present the dimensional relationship of the present invention.

In the longitudinal extent of the belt between the pulleys, the belt teeth of belt Samples C had a height which was 0.11mm (0.004 inches) less than the height of the pulley teeth with which they were tested. The belt tooth height of Belts D were 0.17mm (0.007 inches) or approximately 5.3% greater than the height of the pulley teeth or depth of the pulley groove with which they were tested.

Belts A through D were dynamically tested in accordance with the following procedure. The belts were mounted on a standard water brake tester including a three pulley arrangement which consisted of a driver, a driven and an idler pulley. The belts were tested at a drive load of 5968 watts (8 horsepower) with each belt installed at 409 N (92 lbs) strand tension. In the testing of belts of Type I the driver and driven pulleys had an outside diameter of 54.86mm (2.160 inches) and the back side idler pulley had a diameter of 76.2mm (3 inches). In the tests of Type II the driver and driven pulleys had an outside diameter of 53.31mm (2.099 inches) and the back side idler pulley was of the same dimensions as in the tests of Type I. The belts were tested to failure unless otherwise noted and the lapsed time to the nearest hour to failure of each belt sample is presented in Table I with the average time to failure of each group of belt samples being recorded.

Other belt samples of the Type I construction and identical in dimension to Samples A and B respectively were also tested according to the following procedure and are identified in like manner as Belts A and B. One sample of Belt A and three samples of Belts B were used in the test. Each belt sample was mounted on a dead weight flex tester having a two pulley arrangement consisting of a driver and a driven pulley each having an outside diameter of 54.86mm (2.160 inches). The driver pulley was operated at 3500 rpm with a force between pulley shaft centers of 1111 N (250 lbs). The belts were tested to failure unless otherwise indicated. The lapsed time to the nearest hour of each group of belt samples to failure is shown in Table II with the average time to failure of the three samples of Belts B being presented. Time to incipient failures as well as time to total failure was recorded.

TABLE I
(Water Brake Test)

| Type | Belts | Time to Failure (hours) |
|---|---|---|
| I | A | 85, 96, 80, 105, 32, 61, 121 |
|   |   | Average 82.86 |
|   | B | 335, 394+*, 315+* |
|   |   | Average 348+ |
| II | C | 35, 50, 39, 50, 67, 63, 72, 95, 144 |
|   |   | Average 68.33 |
|   | D | 562, 653, 330, 330, 582, 520, 195, 248, 101 |
|   |   | Average 391.22 |

* Belt samples removed before failure occurred

TABLE 2
(Flex Test)

| | Time to Failure (nearest hour) | |
|---|---|---|
| Type I | Belts A | Belts B |
| Incipient Failure | 53 | 210, 158, 196 |
|   |   | Average 188 |
| Total Failure | 80 | 300, 256, 248+* |
|   |   | Average 268+ |

*Belt sample continued to operate in drive without total failure occurring.

The data in Tables 1 and 2 indicate that the belts B and D having the dimensional relationship with the pulleys of the drive in accordance with the teachings of the present invention have a significantly improved belt life over Belts A and C which have a conventional dimensional relationship with the pulleys. This was true of Type I and II belt and pulley arrangements when tested on a standard water brake tester as detailed above and recorded in Table I and was verified by the results of the dead weight flex test for Type I belt and pulley arrangements as shown in Table 2.

The only significant variable in the comparative tests was the height of the belt teeth as compared to the height of the pulley teeth or depth of the pulley grooves. The height of the belt teeth was greater than the height of the pulley teeth in the case of Belts B and D whereas in the case of Belts A and C the height of the belt teeth was actually less than the height of the pulley teeth or depth of the pulley groove. The testing also revealed that the desired result could be accomplished by using a belt with increased tooth height with pulleys having teeth of conventional height as in the case of Type I belt and pulley combinations or by using belts of conventional tooth height with pulleys of reduced tooth height as in the case of Type II belt and pulley combinations.

These data further indicate that in conventional or prior art drives premature failure occurred in Belts A and C in which a clearance existed between the belt teeth and the bottom of the space or groove between the pulley teeth. The tensile member in these prior art belts had inadequate support in the toothed area of the belts causing the tensile member to assume a chordal path as it traveled around the pulleys (see FIG. 3 of the drawings). This condition caused excess stress on the tensile member in the untoothed area of the belt between the belt teeth and the failure resulted primarily from excessive wear in this area.

In the drives including Belts B and D of the invention, on the other hand, as the belts travel around the pulleys the belt teeth were compressed a limited amount upon contact with the bottom of the pulley grooves and there was substantially no clearance between the flanks of the belt teeth and the flanks of the pulley teeth. The belt teeth of these belt samples provided more adequate support for the tensile member in the toothed area of the belts thereby reducing the stresses on the tensile member in the untoothed area of the belts resulting in the tensile member assuming a more circular or arcuate path as it traveled around the pulleys (see FIG. 2 of the drawings). Consequently, wear in the area of the belt between the belt teeth was reduced and the belt life was significantly increased.

Furthermore, the drives including Belts B and D were observed to operate with less noise and vibration than in those drives including Belts A and C in which conventional dimensional relationships existed between the belts and pulleys.

Incipient failures were noted in the data of Table 2 in addition to total failure in order to compare the effect of the modified dimensions of the invention on delaying the first noticeable indication of belt breakdown. The data from the flex test serve to further verify the effects resulting from the chordal versus circular or arcuate path taken by the tensile member as it traveled around the pulleys. In the case of Belt Samples A in which the belt teeth were not adequately supported the belt tension created by the dead weight caused stress to be concentrated in the area between the belt teeth (untoothed area) resulting in rapid wear. In contrast Belt Samples B made in accordance with the present invention showed a substantial improvement in belt life as illustrated by the data in Table 2.

While certain representative embodiments and details have been shown for the purpose of illustrating the invention, it will be apparent to those skilled in the art that various changes and modifications may be made therein without departing from the spirit or scope of the invention.

What is claimed is:

1. A belt drive comprising: a flexible power transmission belt having a plurality of alternating teeth and grooves extending generally transversely thereof and a pair of toothed pulleys having a plurality of alternating teeth and grooves extending generally axially thereof which engage with the belt teeth and grooves during the operation of the drive, the dimensional relationship of said belt teeth and grooves and said pulley teeth and grooves being such that in the longitudinal extent of the belt between the pulleys the height of the belt teeth is greater than the depth of the pulley grooves while as the belt travels around the pulleys the extreme outwardly facing portions of the belt teeth which confront the pulleys come into contact with the portions of the toothed pulley disposed between the pulley teeth which define the bottom of the pulley grooves and at the same time said belt teeth are compressed to reduce their height so that the extreme radially outwardly facing portions of the pulley teeth come into contact with the portions of the belt disposed between the belt teeth which define the bottoms of the belt grooves.

2. A drive as claimed in claim 1, wherein the height of each belt tooth is a maximum of about 20% greater than the depth of each pulley groove.

3. The drive as claimed in claim 1, wherein the height of each belt tooth is from about 1 to about 15% greater than the depth of each pulley groove.

4. The drive as claimed in claim 1, wherein the height of each belt tooth is about 3 to about 7% greater than the depth of each pulley groove.

5. The drive as claimed in claim 1, wherein the circumferential dimension of the root of each belt tooth is equal to or greater than the circumferential dimension of the root of each pulley tooth as measured on the dedendum line of the teeth as the belt rotates about the pulleys.

6. The drive as claimed in claim 5, wherein the ratio of the circumferential dimension of the root of each said belt tooth to the circumferential dimension of the root of each said pulley tooth is about 2 to 1.

7. The drive as claimed in claim 1, wherein as the belt travels around the pulleys there is substantially no clearance between the flanks of said belt teeth and the flanks of said pulley teeth.

8. A positive drive system comprising the combination of a positive drive belt and a pair of toothed pulleys operating in conjunction therewith, the belt including a body of flexible polymeric material having a tensile member of high modulus essentially inextensible material embedded therein and a plurality of driving teeth of substantially uniform height formed in at least one surface thereof which extend transversely of the belt and are adapted to mesh without any significant change of pitch with teeth of the toothed pulleys, the tensile member disposed substantially on the dedendum line of the driving teeth thereof, each said toothed pulley including a plurality of teeth with each tooth having a height which is less than the height of each belt driving tooth in the longitudinal extent of the belt between the pulleys, while as the belt travels around the pulleys the outer extremities of the addendum of the belt driving teeth frictionally engage the surfaces of the dedendum of the pulley between the pulley teeth with said belt driving teeth being compressed a limited amount to cause the radially outer extremities of the addendum of the pulley teeth to simultaneously frictionally engage the surfaces of the dedendum of the belt between the belt driving teeth.

9. The system as claimed in claim 8, wherein said belt driving teeth provide support for said tensile member and said tensile member assumes a substantially arcuate, non-chordal configuration as it travels around the pulleys.

10. The system as claimed in claim 8, wherein as the belt travels around the pulleys there is substantially no clearance between the flanks of said belt teeth and the flanks of said pulley teeth.

11. The system as claimed in claim 8, wherein the height of each tooth of the pulley is from about 1 to about 15% less than the height of each driving tooth of the belt in engagement therewith.

12. The system as claimed in claim 8, wherein the height of each tooth of the pulley is from about 3 to about 7% less than the height of each driving tooth of the belt in engagement therewith.

13. The system as claimed in claim 8, wherein the height of each tooth of the pulley is about 5% less than the height of each driving tooth of the belt in engagement therewith.

14. The system as claimed in claim 8, wherein said belt teeth have a rectilinear cross-sectional configuration.

15. The system as claimed in claim 8, wherein said belt teeth have a curvilinear cross-sectional configuration.

16. The system as claimed in claim 8, wherein a portion of the cross-sectional configuration of each said belt tooth is rectilinear and a portion thereof is curvilinear.

17. The system as claimed in claim 8, wherein as the belt travels around the pulleys the circumferential dimensions of each belt driving tooth as measured on its dedendum line is equal to or greater than the circumferential dimension of each pulley tooth as measured on its dedendum line.

18. The system as claimed in claim 17, wherein said circumferential dimension of each belt driving tooth is about twice as great as said circumferential dimension of each pulley tooth.

19. A flexible power transmission belt adapted for use with a pair of pulleys in a belt drive with said pulleys having a plurality of alternating teeth and grooves extending generally axially thereof, said belt comprising a plurality of alternating teeth and grooves extending generally transversely thereof which are intended to engage the teeth and grooves of the pulleys during the operation of the drive, said belt being adapted for a compressive engagement with the pulleys in that the height of said belt teeth in the longitudinal extent of the belt between the pulleys is greater than the depth of the grooves of the pulley while as the belt travels around the pulleys the extreme outwardly facing portions of the belt teeth which confront the pulley come into contact with the portions of the pulley disposed between the pulley teeth which define the bottom of the pulley grooves and at the same time said belt teeth are compressed to reduce their height so that the extreme radially outwardly facing portions of the pulley teeth come into contact with the portions of the belt disposed between the belt teeth which define the bottoms of the belt grooves.

20. The belt as claimed in claim 19, wherein the height of each tooth of the belt is a maximum of about 20% greater than the depth of each groove of the pulley.

21. The belt as claimed in claim 19, wherein the height of each tooth of the belt is from about 1 to about 15% greater than the depth of each groove of the pulley.

22. The belt as claimed in claim 19, wherein the height of each tooth of the belt is from 3 to about 7% greater than the depth of each groove of the pulley.

23. The belt as claimed in claim 19, wherein in said longitudinal extent of the belt the width of each tooth of the belt at its base as measured substantially on the dedendum line of the belt teeth is equal to or greater than the distance between any two said teeth as measured on the dedendum line of the belt teeth.

24. The belt as claimed in claim 23, wherein said width of each said belt tooth is from about 1½ to about 2 times greater than said distance between any two said teeth.

25. The belt as claimed in claim 19, wherein said teeth have a rectilinear cross-sectional configuration.

26. The belt as claimed in claim 19, wherein said teeth have a curvilinear cross-sectional configuration.

27. The belt as claimed in claim 19, wherein a portion of the cross-sectional configuration of each tooth is rectilinear and a portion thereof is curvilinear.

28. The belt as claimed in claim 19 for operating in a positive drive system in conjunction with a pair of toothed pulleys, said belt including a body of flexible polymeric material having a plurality of driving teeth of substantially uniform height connected thereto in at least one surface thereof that are adapted to mesh substantially without change of pitch with the teeth of the toothed pulley and a tensile member of high modulus essentially inextensible material embedded therein and disposed substantially on the dedendum line of the teeth, said driving teeth having a height which is a maximum of 20% greater than the height of the teeth of the pulleys.

29. The belt as claimed in claim 28, wherein said belt driving teeth provide support for said tensile member and said tensile member assumes a substantially arcuate, non-chordal configuration as it travels around the pulleys.

30. The belt as claimed in claim 28, wherein said belt driving teeth include a facing layer of textile fabric material.

31. At least one pulley adapted for use with a flexible power transmission belt in a belt drive including at least two pulleys around which the belt is trained with the belt including a plurality of alternating teeth and grooves extending generally transversely thereof, said pulley comprising: a plurality of alternating teeth and grooves extending generally axially thereof which are intended to engage the teeth and grooves of the belt during the operation of the drive, said pulley being adapted for a compressive engagement with the belt in that the depth of the pulley grooves is less than the height of the belt teeth in the longitudinal extent of the belt between the pulleys while as the belt travels around the pulleys the extreme outwardly facing portions of the belt teeth which confront the pulley come into contact with the portions of the pulley disposed between the pulley teeth which define the bottom of the pulley grooves and at the same time said belt teeth are compressed to reduce their height so that the extreme radially outwardly facing portions of the pulley teeth come into contact with the portions of the belt disposed between the belt teeth which define the bottoms of the belt grooves.

32. The pulley as claimed in claim 31, wherein the depth of each groove is a maximum of about 20% less than the height of each tooth of the belt.

33. The pulley as claimed in claim 31, wherein the depth of each groove is from about 1 to about 15% less than the height of each tooth of the belt.

34. The pulley as claimed in claim 31, wherein the depth of each groove is from 3 to about 7% less than the height of each tooth of the belt.

35. The pulley as claimed in claim 31 for operating in a positive drive system in conjunction with a toothed positive drive belt, wherein the circumferential dimension of the cross section of each pulley tooth as measured at the intersection of the tangents of the flanks thereof with the addendum line of the pulley teeth is equal to or less than the circumferential distance between the confronting flanks of any two adjacent said pulley teeth as measured at the intersection of the tangents of said confronting flanks with the addendum line of the pulley teeth.

36. The pulley as claimed in claim 35, wherein said circumferential dimension of each said pulley tooth is from about one-fourth to about one-half of the said circumferential distance between any two said pulley teeth.

* * * * *

UNITED STATES PATENT OFFICE
CERTIFICATE OF CORRECTION

PATENT NO. : 4,037,485
DATED : July 26, 1977
INVENTOR(S) : Ronald D Hoback

It is certified that error appears in the above-identified patent and that said Letters Patent are hereby corrected as shown below:

Column 6, line 57 "leasing" should be -- leading --.

Signed and Sealed this

Third Day of January 1978

[SEAL]

Attest:

RUTH C. MASON
Attesting Officer

LUTRELLE F. PARKER
Acting Commissioner of Patents and Trademarks